United States Patent [19]

Fischer et al.

[11] Patent Number: 5,710,197
[45] Date of Patent: Jan. 20, 1998

[54] CROSSLINKED POLYMER PARTICLES CONTAINING A FLUORESCENT DYE

[75] Inventors: Wolfgang Fischer, Ludwigshafen; Andreas Deckers, Flomborn; Norbert Güntherberg, Speyer; Ekkehard Jahns, Hirschberg; Sylke Haremza, Neckargemünd; Werner Ostertag, Grünstadt; Helmut Schmidt, Osthofen, all of Germany

[73] Assignee: BASF Aktiengesellschaft, Ludwigshafen, Germany

[21] Appl. No.: 501,927

[22] Filed: Jul. 13, 1995

[30] Foreign Application Priority Data

Jul. 14, 1994 [DE] Germany ............... 44 24 817.2

[51] Int. Cl.$^6$ ............................................. C08K 5/45
[52] U.S. Cl. ..................... 524/82; 524/83; 524/84; 524/92; 524/107; 523/351; 526/204; 546/37
[58] Field of Search ..................... 524/82, 83, 84, 524/92, 107; 546/37; 526/204; 523/351

[56] References Cited

U.S. PATENT DOCUMENTS

| | | |
|---|---|---|
| 3,734,872 | 5/1973 | Wakimoto et al. ............... 260/22 |
| 3,880,869 | 4/1975 | Scheuermann et al. ............... 260/296 P |
| 4,002,619 | 1/1977 | Dengler et al. ............... 524/92 X |
| 4,379,934 | 4/1983 | Graser et al. ............... 546/37 |
| 4,446,324 | 5/1984 | Graser et al. ............... 546/37 |
| 4,618,694 | 10/1986 | Iden et al. ............... 558/416 |
| 4,812,141 | 3/1989 | Baumgartner et al. ............... 8/506 |
| 4,931,220 | 6/1990 | Haynes et al. ............... 252/586 |
| 5,294,664 | 3/1994 | Morrison, Jr. et al. ............... 524/560 |

FOREIGN PATENT DOCUMENTS

| | | |
|---|---|---|
| 422474 | 4/1991 | European Pat. Off. . |
| 277 980 | 11/1991 | European Pat. Off. . |
| 570782 | 11/1993 | European Pat. Off. . |
| 24 51 732 | 5/1976 | Germany . |
| 39 33 093 | 4/1991 | Germany . |

*Primary Examiner*—Edward J. Cain
*Attorney, Agent, or Firm*—Keil & Weinkauf

[57] ABSTRACT

Fluorescent pigments contain essentially a polymer matrix based on polymethyl methacrylate and a nonpolar fluorescent dye from the coumarin or perylene series, the polymer matrix being a crosslinked polymethacrylate or polyacrylate prepared by suspension polymerization.

4 Claims, No Drawings

CROSSLINKED POLYMER PARTICLES CONTAINING A FLUORESCENT DYE

The present invention relates to fluorescent pigments containing essentially a poller matrix based on polyethyl methacrylate and a nonpolar fluorescent dye from the coumarin or perylene series, wherein the poller matrix is a crosslinked polyethacrylate or polyacrylate prepared by suspension polymerization.

The present invention furthermore relates to a process for the preparation of the novel fluorescent pigments, their use for the production of moldings, films, printing inks, dispersions and printed products, and moldings, films, printing inks, dispersions and printing products produced therefrom.

DE-A 39 33 903 describes fluorescent pigments obtainable by mixing a polymer matrix based on, inter alia, polymethyl methacrylate containing at least one fluorescent dye from the coumarin or perylene series. The fluorescent pigments of DE-A 39 33 903 have very good light fastness, but even better migration fastness is required for some applications.

It is an object of the present invention to provide further fluorescent pigments which have both very good light fastness and very good migration fastness.

We have found that this object is achieved by the fluorescent pigments defined at the outset.

We have also found a process for the preparation of the novel fluorescent pigments, their use for the production of moldings, films, printing inks, dispersions and printed products, and moldings, films, printing inks, dispersions and printed products produced therefrom.

The novel fluorescent pigments contain essentially a polymer matrix and a fluorescent dye from the coumarin or perylene series, the polymer matrix being a crosslinked polymethacrylate or polyacrylate prepared in the presence of a fluorescent dye by suspension polymerization.

The novel fluorescent pigments are preferably obtained by suspension polymerization of a mixture consisting essentially of (A) from 69.9 to 99.8, preferably from 80 to 99.7% by weight of a $C_1$–$C_8$-alkyl ester of acrylic or methacrylic acid, (B) from 0 to 29.9, preferably from 0.1 to 29.9, particularly preferably from 0.1 to 20, % by weight of a copolymerizable, monoethylenically unsaturated monomer, (C) from 0.1 to 30.0, preferably from 0.1 to 20.0, % by weight of a copolymerizable, polyfunctional, crosslinking monomer and (D) from 0.1 to 15.0, preferably from 0.1 to 10.0, particularly preferably from 0.5 to 10.0, % by weight, based on the sum of (A) and (B), of a nonpolar fluorescent dye from the coumarin or perylene series.

According to the invention, methyl methacrylate (MMA), ethyl methacrylate, n-propyl methacrylate, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methacrylate or 2-ethylhexyl methacrylate, particularly preferably methyl methacrylate, and mixtures of these monomers, methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate or 2-ethyl-hexyl acrylate, particularly preferably n-butyl acrylate, and mixtures of these monomers with one another and with the methacrylates are used as $C_1$–$C_8$-alkyl esters of methacrylic or acrylic acid (component (A)).

Methacrylic acid, acrylic acid, $C_1$–$C_8$-hydroxyalkyl esters of methacrylic or acrylic acid, such as 2-hydroxyethyl acrylate, acrylonitrile, 2-hydroxypropyl methacrylate, 2-hydroxypropyl acrylate, dimethylaminoethyl methacrylate, dimethylaminoethyl acrylate or styrene, preferably 2-hydroxyethyl acrylate, acrylic acid and methacrylic acid, or mixtures of the abovementioned monomers (B), may be used as copolymerizable, monoethylenically unsaturated monomers (B).

The copolymerizable, polyfunctional, crosslinking monomers (C) used are in general crosslinking agents which are known per se and which contain two, three or four, preferably two, double bonds which are capable of undergoing copolymerization and are not conjugated in the 1,3 position. Such monomers suitable for crosslinking are, for example, esters prepared from polyhydride alcohols and methacrylic or acrylic acid, such as ethylene glycol dimethacrylate, ethylene glycol diacrylate, butanediol dimethacrylate or butanediol diacrylate, or allyl compounds, such as allyl methacrylate, triallyl cyanurate, divinylbenzene, diallyl maleate, diallyl fumarate or diallyl phthalate, hexanediol dimethacrylate, hexanediol diacrylate and the acrylate of tricyclodecenyl alcohol, preferably butanediol diacrylate, hexanediol diacrylate, ethylene glycol diacrylate and the acrylate of tricyclodecenyl alcohol.

According to the invention, the nonpolar fluorescent dyes (D) used are those from the coumarin or perylene series.

Suitable nonpolar coumarin dyes are, for example, dyes of this type as described in U.S. Pat. No. 3,880,869. Coumarin dyes of the formula I

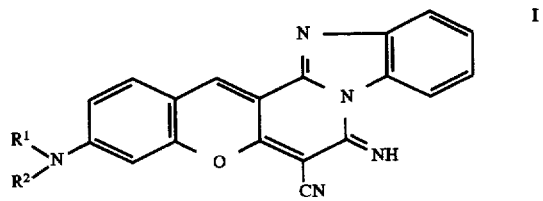

where $R^1$ and $R^2$ are identical or different and, independently of one another, are each $C_1$–$C_4$-alkyl, in particular ethyl, are noteworthy.

Fluorescent pigments which contain coumarin dyes of the formula II

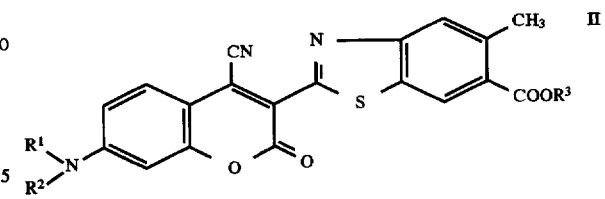

where $R^3$ is $C_1$–$C_{11}$-alkyl, are also noteworthy.

Suitable nonpolar perylene dyes are, for example, dyes of this type as described in U.S. Pat. No. 4,618 694, DE-A-2 451 782, U.S. Pat. No. 379 934, U.S. Pat. No. 4,446,324 or EP-A-277 980.

Other suitable nonpolar perylene dyes are, for example, dyes of this type as described in EP-A-73 007.

Fluorescent pigments which contain perylene dyes of the formula III

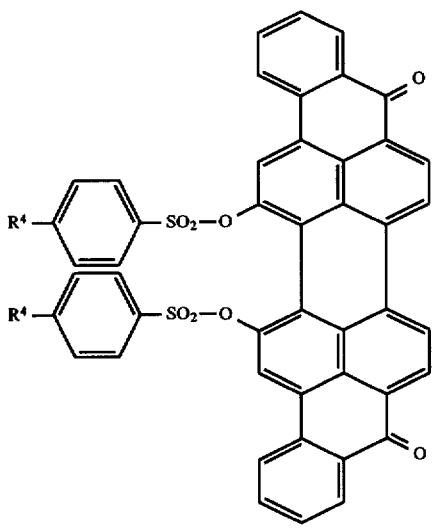

where $R^4$ is $C_1$–$C_{13}$-alkyl, are noteworthy.

Fluorescent pigments which contain perylene dyes of the formula IV

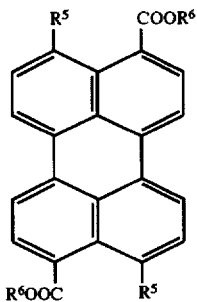

where $R^5$ is hydrogen or cyano and $R^6$ is $C_1$–$C_{11}$-alkyl, are particularly preferred.

Fluorescent pigments which contain perylene dyes of the formula V

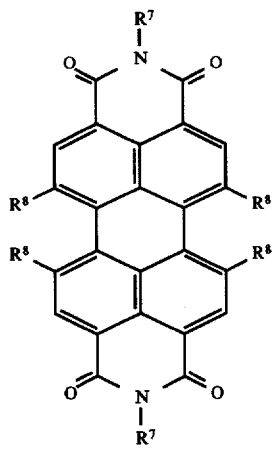

where $R^7$ is $C_5$–$C_{20}$-alkyl which may contain an oxygen atom in the carbon chain, or is phenyl which is monosubstituted or polysubstituted by $C_1$–$C_{13}$-alkyl or by $C_1$–$C_{13}$-alkoxy, and $R^8$ is hydrogen, chlorine or phenoxy which is unsubstituted or substituted by halogen, $C_1$–$C_4$-alkyl or $C_1$–$C_{14}$-alkoxy, are also particularly preferred.

Fluorescent pigments which contain dyes of the formula V, where $R^7$ is phenyl which is monosubstituted or polysubstituted by $C_1$–$C_4$-alkyl or by $C_1$–$C_4$-alkoxy and $R^8$ is hydrogen, phenoxy or chlorine, are particularly preferred.

Fluorescent pigments which contain a dye of the formula IV, where each radical $R^5$ is cyano and each radical $R^6$ is butyl, are very particularly noteworthy.

Fluorescent pigments which contain a dye of the formula V, where $R^7$ is 2,6-diisopropylphenyl and $R^8$ is phenoxy, are also very particularly noteworthy.

Suitable radicals $R^6$, $R^1$, $R^2$, $R^3$ and $R^4$ are, for example, methyl, ethyl, propyl, isopropyl, butyl, isobutyl and sec-butyl.

$R^6$, $R^3$ and $R^4$ as well as $R^7$ are furthermore, for example, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl or undecyl.

$R^7$ and $R^4$ are furthermore, for example, dodecyl, tridecyl or isotridecyl.

Radicals $R^7$ are furthermore, for example, tetradecyl, pentadecyl, hexadecyl, heptadecyl, octadecyl, nonadecyl, eicosyl (the above names isooctyl, isononyl, isodecyl and isotridecyl are trivial names and originate from the alcohols obtained by the oxo synthesis, cf. Ullmanns Enzyklopädie der technischen Chemie, 4th Edition, Volume 7, pages 215 to 217, and Volume 11, pages 435 and 436), 2-propoxyethyl, 2-isopropoxyethyl, 2-butoxyethyl, 2- or 3-methoxypropyl, 2- or 3-ethoxypropyl, 2- or 3-propoxypropyl, 2-or or 3-isopropoxypropyl, 2- or 3-butoxypropyl, 2- or 3-(2-ethyl hexyloxy)propyl, 2- or 4-methoxybutyl, 2- or 4-ethoxybutyl, 2- or 4-propoxybutyl, 2- or 4-isopropoxybutyl, 2- or 4-butoxybutyl, 2- or 4-(2-ethylhexyloxy)butyl, 2-methyl-6-isopropylphenyl, 2-methyl-6-sec-butylphenyl, 2-methyl-6-tert-butylphenyl, 2-ethyl -6-isopropylphenyl, 2-ethyl-6-sec-butylphenyl, 2-ethyl -6-tert-butylphenyl, 2-methylphenyl, 2,3-, 2,4-, 2,5- or 2,6-dimethylphenyl, 2,4,6-trimethylphenyl, 2-methyl-4-methoxyphenyl, 2,5-dimethyl-methoxyphenyl, methoxyphenyl, 2-ethylphenyl, 2,6-diethylphenyl, 2,6-diethyl-4-methylphenyl, 2-isopropylphenyl, 2,4-, 2,5- or 2,6-diisopropylphenyl, 2-n-butylphenyl, 2-sec-butylphenyl, 2-n-pentylphenyl, 2-n-hexylphenyl, 2,5-dimethoxyphenyl, 2,5-diethoxyphenyl, 2,4-dimethoxyphenyl, 2-(2'-methylpentyl)phenyl, 2-n-octylphenyl, 2-methoxyphenyl, 2-ethoxyphenyl, 2,4-diethoxyphenyl, 2,3-dimethoxyphenyl or 2,3-diethoxyphenyl.

Radicals $R^8$ are, for example, 2-, 3- or 4-fluorophenoxy, 2-, 3- or 4-chlorophenoxy, 2-, 3- or 4-bromophenoxy, 2-, 3- or 4-tert-butylphenoxy, 2-isopropyl-4-methylphenoxy, 2,3-, 2,4-, 2,5- or 2,6-dichlorophenoxy, 2,4,5- or 2,4,6-trichlorophenoxy, 2-, 3- or 4-methylphenoxy, 2,3-, 2,4-, 2,5-, 2,6- or 3,5-dimethylphenoxy, 2,5,6-trimethylphenoxy, 2-methyl-4-chlorophenoxy, 2-methyl-5-chlorophenoxy, 2-methyl-6-chlorophenoxy, 2-ethylphenoxy, 2,6-diethylphenoxy, 2,6-diethyl-4-methylphenoxy, 2-isopropylphenoxy, 3-methyl-4-chlorophenyl, 4-propylphenoxy, 4-butylphenoxy, 2-, 3- or 4-methoxyphenoxy, 2-, 3- or 4-ethoxyphenoxy, 2-, 3- or 4-propoxyphenoxy, 2-, 3- or 4-isopropoxyphenoxy, 2-, 3- or 4-butoxyphenoxy or 2,4-dimethoxyphenoxy.

The polymerization is carried out in a manner known per se, by the suspension polymerization method (cf. Houben- Weyl, Methoden der organischen Chemie, 4th Edition, Vol. XIV/1, Georg Thieme Verlag, Stuttgart 1961, pages 406–429). For this purpose, the aqueous phase and monomer phase, containing the components (A), if desired (B), (C) and (D), are usually initially taken, and conventional dispersants are added. Water-soluble substances or substances rendered soluble in water, such as pectins, gelatine, methylcellulose or other cellulose ethers, are suitable for this purpose. Polyvinyl alcohol, alkali metal salts of polyacrylic acid or polymethacrylic acid or alkali metal salts of copolymers of methyl methacrylate and methacrylic acid may also be used. In addition, the aqueous phase may be buffered; salts of phosphoric acid, for example mixtures of sodium dihydrogen phosphate and disodium hydrogen phosphate, are usual for the alkaline range.

In order to improve the processing properties, heat stabilizers, for example sterically hindered phenols, and lubricants, such as stearic acid, may be added.

In order to regulate the molecular weight of the polymer of which the shell consists, conventional molecular weight regulators or polymer chain transfer agents can be used in the polymerization. These are in general oil-soluble compounds. Suitable compounds of this type are, for example, mercaptans, such as mercaptoethanol, mercaptopropanol, mercaptobutanols, n-dodecyl mercaptan, mercaptosuccinic acid, mercaptopropionic acid, mercaptoglycerol, mercaptoacetic acid, esters of thioglycolic acid, such as hexyl thioglycolate, mercapto glycol silanes, such as 3-mercaptopropyl trimethoxysilane and 3-mercaptopropylmethyldimethoxysilane, ethers, such as dioxane, tetrahydrofuran, tetrahydrofurfuryl alcohol or tetrahydrofurfuryl acetate, alcohols, such as isopropanol, n-butanol and n-decanol, and aromatic hydrocarbons, such as isopropylbenzene.

The regulators used are preferably esters of thioglycolic acid, such as ethylhexyl thioglycolate and hexyl thioglycolate, and dodecyl mercaptan. If regulators are used in the polymerization, the amounts of regulator are preferably from 0.05 to 1.5% by weight, based on the total amount of monomers.

The polymerization is carried out as a rule in the presence of free radical polymerization initiators. All conventional peroxo and azo compounds in the amounts usually used, for example from 0.1 to 5% by weight, based on the weight of the monomers, may be employed for this purpose. Preferred polymerization initiators are those which are soluble in the oil phase or in the monomers.

Examples of these are tert-butyl peroxyneodecanoate, tert-amyl peroxypivalate, dilauroyl peroxide, tert-amyl peroxy-2-ethyl-hexanoate, 2,2'-azobis(2,4-dimethylvaleronitrile), 2,2'-azobis (2-methylbutyronitrile), dibenzoyl peroxide, tert-butyl -2-ethylhexanoate, di-tert-butyl hydroperoxide, 2,5-dimethyl -2,5-di-(tert-butylperoxy)hexane and cumyl hydroperoxide. Preferably used free radical initiators are di-(3,5,5-tri-methylhexanoyl) peroxide, 4,4'-azobisisobutyronitrile, tert-butyl perpivalate and dimethyl 2,2'-azobisisobutyrate.

The polymerization temperature is in general from 20° to 150° C., preferably from 40° to 110° C.

The pressure during the polymerization is chosen as a rule to be from 50 to 2000, preferably from 60 to 500, kPa.

The pH of the reaction mixture is chosen in general to be from 2 to 12, preferably from 4 to 10.

In a preferred embodiment, the reaction batch is purged several times with an inert gas, such as nitrogen, and is let down each time. After purging again with inert gas,. the monomer phase is first suspended at room temperature in the aqueous phase by stirring and is then heated to the polymerization temperature. After a reaction time of from 1 to 20, preferably from 2 to 10, hours, the polymerization is as a rule complete.

With the use of conventional stirrer types, such as impeller stirrers, observations to date have shown that polymer particles having a diameter of from 0.1 to 3 mm are obtained in water.

A microsuspension process in which the particle size can be brought to a desired dimension is particularly advantageous. In addition, experience to date has shown that particle shapes which are more uniform than those achievable by milling coarse particles (cf. DE-A-39 33 903) are obtained. The polymer particles prepared by the microsuspension process generally have a particle diameter of from 1 to 100 µm (determined by measuring the Fraunhofer diffraction using a MALVERN Mastersizer). The polymer particles are generally produced with the aid of highly shearing stirring units, such as dispersion stirrers or Ultra-TurraX® units (from IKA Labortechnik, Staufen), larger amounts of dispersants than usual normally bring used for stabilizing the monomer droplets during the polymerization.

After the polymerization, the product is usually filtered off, washed with water and then dried. The dried novel fluorescent pigments have, as a rule, a particle size of from 0.1 to 3 mm, preferably from 0.5 to 3 mm. If desired, smaller particle sizes can be obtained, for example, by milling.

In a preferred embodiment, particularly when polymerization is effected by the microsuspension process, the suspension obtained is processed by spray-drying or filtration and drying in a manner known per se.

The novel fluorescent pigments may be added either as a dispersion or after (spray) drying to printing inks or dispersions, in order to produce, inter alia, printed products. It is also possible to mix the novel fluorescent pigments into plastics in order, for example, to produce colored moldings and films, such as luminous marks and fluorescent plastic films, for example for covering greenhouses, for decorative purposes and as advertising or information media.

Compared with the prior art, the novel fluorescent pigments have both very good light fastness and very good migration fastness.

EXAMPLES

A. Light fastness

The light fastnesses were determined according to DIN 16525 on prints and were evaluated with the aid of the blue wool scale (DIN 54003).

B. Migration

The migration of the colored pigments was determined according to DIN 53775.

Printed films of flexible PVC were covered with a white film of flexible PVC and stored under load for one week at 50° C. The migration of the pigments into the white film was evaluated.

C. Particle size determination

The particle size was determined using a MALVERN Mastersizer 3600 (cf. also Verfahrenstechnik 24 (1990), 36 et seq.). The Fraunhofer diffraction was measured at a wavelength of 633 nm.

The particle size distribution was determined in a range from 1 to 1000 µm, water being used as the solvent.

EXAMPLE 1

The following mixture was introduced into a reaction vessel having an impeller stirrer:

82 kg of water 574 g of Accumer® 1530 (polyacrylic acid, 25% strength by weight in water; Rohm and Haas; viscosity 135–175 mPa·s at 25° C.; pH 2.1–3.0)

150 g of Na$_2$SO$_4$ 48 kg of methyl methacrylate 240 g of allyl methacrylate 120 g of n-dodecyl mercaptan 27.6 g of tert-butyl peroxy-2-ethylhexanoate 20 g of tert-butyl peroxy-3,5,5-trimethylhexanoate 21.1 g of 2,2-bis(tert-butylperoxy)butane 1 kg of fluorescent dye The kettle content was purged with nitrogen with thorough stirring and then heated gradually to 120° C. The subsequent polymerization was carried out for 1.5 hours at 110° C. The product was filtered off and washed with water. The dried product had a particle size of from about 0.5 to 3 mm.

EXAMPLE 2

The following mixture was introduced into a 4 l kettle having a dispenser stirrer (diameter 5 cm):

730 g of water 4.3 g of Na$_2$HPO$_4$·12 H$_2$O 1.2 g of NaH$_2$PO$_4$·2H$_2$O 9 g of a 1.6% strength by weight aqueous solution of a co-polymer of 65% by weight of methacrylic acid and 35% by weight of methyl methacrylate (neutralized with NaOH to pH 7); (Röhm GmbH; Rohagit® S; 3800–5500 mPa·s at 25° C.; neutralized 3% strength by weight aqueous solution)

200 g of a 10% strength by weight solution of polyvinyl alcohol (Hoechst AG, Mowiol® 40–88) (degree of hydrolysis 88 mol %, molecular weight M$_w$ of 127,000) in water 442 g of methyl methacrylate 13.5 g of butanediol diacrylate 0.6 g of dilauroyl peroxide 0.15 g of tert-butyl perneodecanoate 9.1 g of fluorescent dye The mixture was heated to 65° C. in the course of 40 minutes while stirring at a speed of 3500 min$^{-1}$, heated to 73° C. in a further 30 minutes and kept at 73° C. for 50 minutes with continuous stirring. Thereafter, the reacting mixture was transferred by means of a peristaltic pump into a preheated 4 l kettle provided with an anchor stirrer (150 min$^{-1}$) and was kept there at 73° C. for a further 2.5 hours. Thereafter, the mixture was heated to 85° C. in the course of one hour and then cooled. The dispersion obtained had a solids content of 34.5% by weight and consisted of crosslinked particles having a diameter of from 2 to 8 µm and colored with fluorescent dye.

EXAMPLE 3

As for Example 2, but with 20.25 g of butanediol diacrylate.

EXAMPLE 4

As for Example 2, but with 27 g of butanediol diacrylate.

The stated pigments (the same dye (for formula see below) was used in all examples and in the experiment according to the prior art) were tested for their migration fastness and light fastness.

|  | Migration fastness | Light fastness |
|---|---|---|
| Example 1 | 2– | >6 |
| Example 2 | 2+ | >6 |
| Example 3 | 1 | >6 |
| Example 4 | 1 | >6 |
| Comparative Example*) | 3 | >6 |

*)Preparation as described in DE 39 33 903 (Example 2).

Dye used: (from DE-A 39 33 903, Example 2) which corresponds to U.S. Pat. No. 5,470,502.

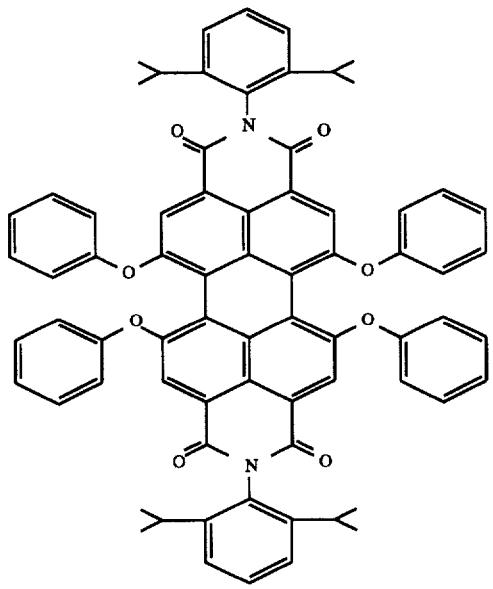

We claim:

1. A process for the preparation of a fluorescent pigment comprising a polymer matrix based on polymethyl methacrylate and a nonpolar fluorescent dye from the coumarin or perylene series, wherein the polymer matrix is a crosslinked polymethacrylate or polyacrylate prepared by suspension polymerization, wherein a mixture comprising (A) from 69.9 to 99.8% by weight of a C$_8$–C$_8$-alkyl ester of acrylic or methacrylic acid, (B) from 0 to 29.9% by weight of a copolymerizable, monoethylenically unsaturated monomer and (C) from 0.1 to 30.0% by weight of a copolymerizable, polyfunctional, crosslinking monomer is polymerized in suspension in the presence of (D) from 0.1 to 15.0% by weight, based on the sum of (A) and (B), of a nonpolar fluorescent dye from the coumarin or perylene series and recovering the fluorescent pigment from the reaction mixture.

2. A process as defined in claim 1, wherein the obtained fluorescent pigment is recovered in the form of particles having a diameter of from about 1 to 100 µm.

3. A process as defined in claim 1, wherein the obtained fluorescent pigment is recovered by filtration.

4. A process as defined in claim 1, wherein the obtained fluorescent pigment is spray dried.

* * * * *

UNITED STATES PATENT AND TRADEMARK OFFICE
CERTIFICATE OF CORRECTION

PATENT NO.: 5,710,197

DATED: January 20, 1998

INVENTOR(S): FISCHER et al.

It is certified that error appears in the above-identified patent and that said Letters Patent is hereby corrected as shown below:

Column 8, claim 1, line 46, "$C_8$-$C_8$-" should be -- $C_1$-$C_8$- --.

Signed and Sealed this

Thirty-first Day of March, 1998

*Attest:*

BRUCE LEHMAN

*Attesting Officer*     *Commissioner of Patents and Trademarks*